UNITED STATES PATENT OFFICE.

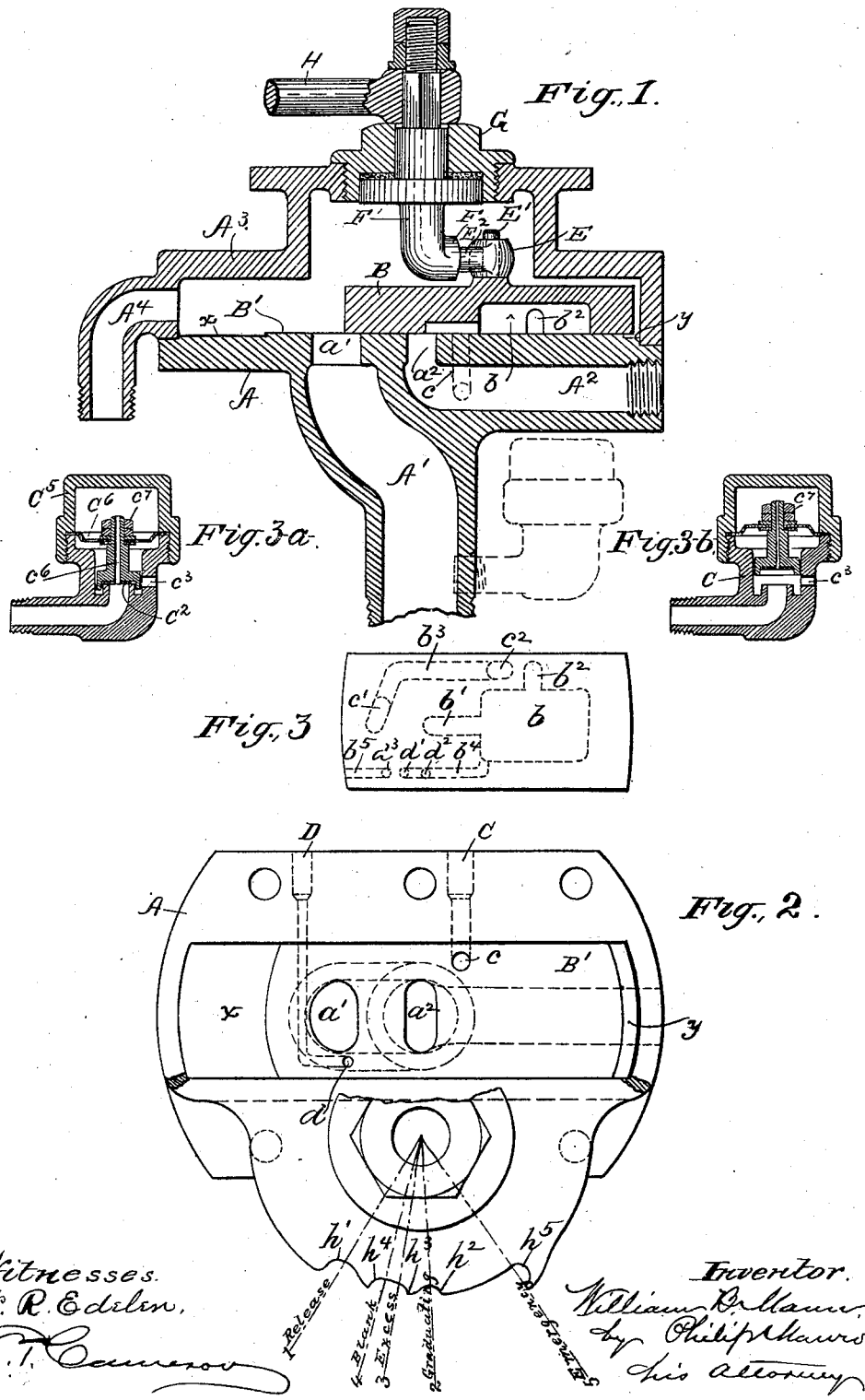

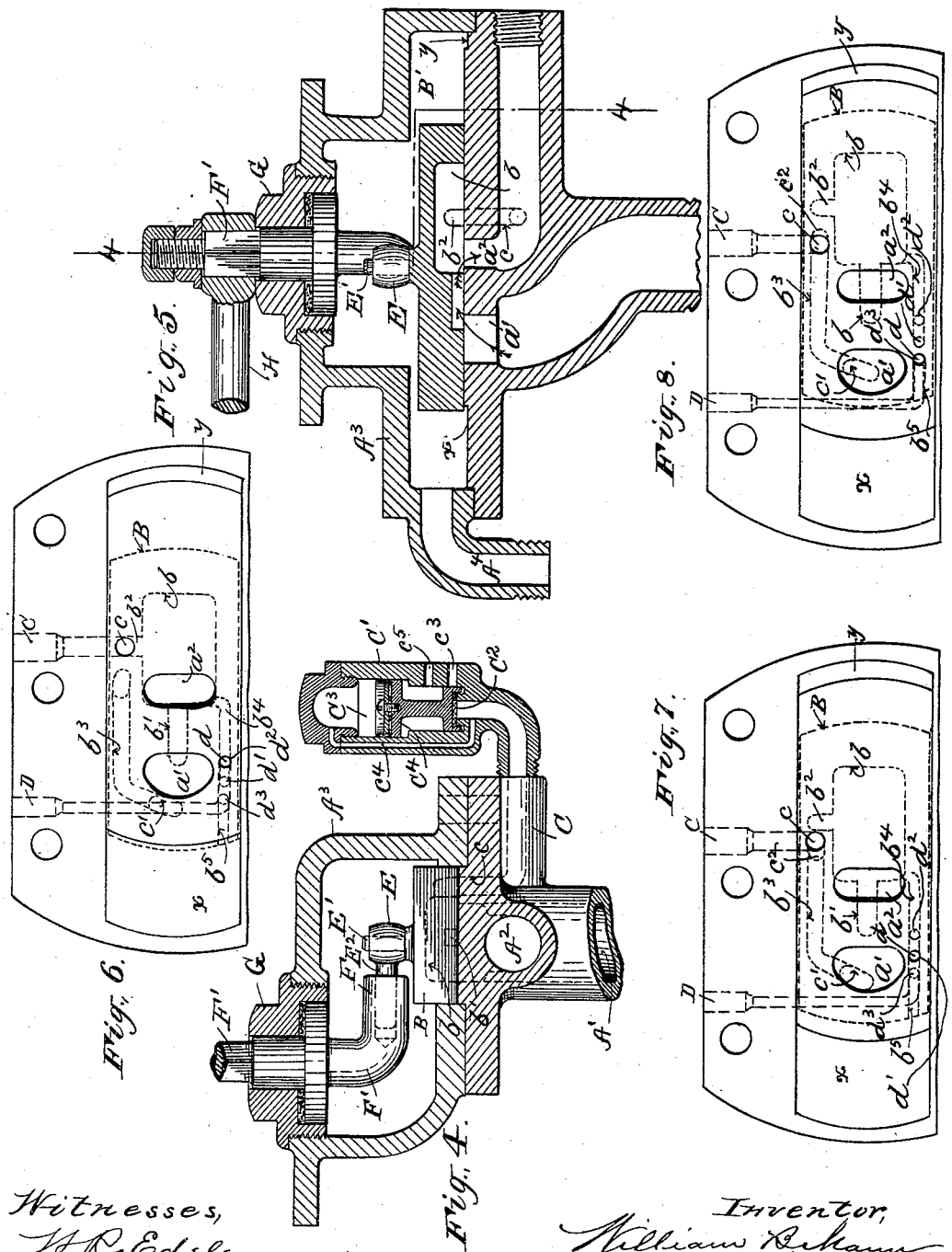

WILLIAM B. MANN, OF BALTIMORE, MARYLAND.

ENGINEER'S VALVE.

SPECIFICATION forming part of Letters Patent No. 630,384, dated August 8, 1899.

Application filed March 14, 1899. Serial No. 709,010. (No model.)

*To all whom it may concern:*

Be it known that I, WILLIAM B. MANN, a citizen of the United States of America, and a resident of the city of Baltimore, State of Maryland, have invented a new and useful Improvement in Engineers' Valves, which invention is fully set forth in the following specification.

My invention relates to engineers' valves employed in connection with automatic air-brake mechanism to control the supply of air to and its escape from the train-pipe when the application or release of the brakes is effected. Valves of this class have several functions to perform.

First. When in "release" position, the valve should open a free passage from the main air-reservoir on the engine to the train-pipe, to the end that pressure in said pipe may be raised to the point where it will operate the triple valve to vent the brake-cylinder to the atmosphere and place the auxiliary reservoir in communication with the train-pipe. In this first or release position the engineer's valve should also place the main air-reservoir in communication with the pump-governor, to the end that the latter may act to check the pump when the pressure in the main reservoir has reached the maximum desired.

Second. The engineer's valve when in "graduating" position should cut off the main reservoir from the train-pipe and place the latter in communication with the atmosphere through a restricted passage, to the end that the slight reduction in train-pipe pressure required to secure the movements of the triple valves necessary for graduation or service application of the brakes may be obtained. In this second or graduating position of the brakes it is also necessary that the pump-governor should be cut off from the pressure in the main reservoir and vented to the atmosphere, so that pressure in the governor may be reduced and the pump set in motion to raise the pressure in the main reservoir up to a point where it will be amply sufficient to effect the instant release of the brakes and to recharge the auxiliary reservoirs.

Third. When the engineer's valve moves from graduating position, so as to close the passage from the train-pipe to the atmosphere, it is necessary to still leave the pump-governor in communication with the atmosphere until the desired "excess" of pressure is obtained, and the third position is therefore known as the "excess" position. When the engineer's valve is moved from the second or graduating position to the third or excess position and the escape of the column of air which is rushing forward through the long train-pipe is thus suddenly cut off, there is a tendency to create a pulse or wave of increased pressure, which would operate the triple valves on some of the forward cars of the train to release the brakes if means of relief were not provided, and it is therefore necessary in the excess position to momentarily open the train-pipe to the atmosphere just long enough to vent this increased pulse or wave.

Fourth. The desired pressure being secured in the main reservoir the engineer's valve is moved to its fourth or "blank" position— that is, a position in which there is no communication between the main reservoir and the train-pipe or between the latter and the atmosphere for producing any movement of the triple valve. As this position is only assumed when the required excess of pressure is had in the main reservoir, communication is opened between the latter and the pump-governor, to the end that pressure may pass to the latter and cause it to stop the pump. In case the desired excess of pressure in the main reservoir already exists when the engineer's valve is moved from the second or graduating position there is no necessity for stopping the valve in the third or excess position, and it may be moved at once from the second or graduating to the fourth or blank position, and it is therefore necessary in the blank position to provide means to relieve the train-pipe of the pulse or wave of back pressure mentioned in connection with the third or excess position.

Fifth. It is essential that the engineer's valve should be so constructed that in case of emergency it can be shifted into position to permit unrestricted communication between the train-pipe and the atmosphere, to the end that the pressure in the train-pipe may be suddenly lowered to the point necessary to secure quick action of all the triple-valve mechanisms on the train.

Furthermore, these various positions of the engineer's valve need not necessarily be assumed in the order named, and the valve must therefore be capable of shifting promptly from any one of the positions to any other and still accurately perform all of the functions named.

From the foregoing it will be apparent that the engineer's valve has a large number of functions to perform during a great variety of movements, and it will also be understood that the safe operation of the train depends upon the accurate performance of these functions at all times. It is therefore essential that the engineer's valve be so constructed that it is not liable to get out of order, easy to manipulate, and efficient in operation.

Engineer's valves heretofore used have been of intricate and complicated construction, with the various parts so arranged that the wear incident to use speedily rendered them ineffective in operation and necessitated frequent repairs.

The object of the present invention is to provide an engineer's valve which while accurately and efficiently performing the multiplicity of functions required of such valves shall nevertheless be simple in construction and operation and with the parts so arranged that the wear incident to use will be reduced to a minimum and shall not interfere with the efficient operations of the valve.

With these objects in view my invention consists, first, in a valve-casing having ports therein leading to the main reservoir, the train-pipe, and the atmosphere, and a slide-valve in said casing, which so controls the train-pipe port as to place it in communication with either of the other ports or to wholly disconnect it from both, but without at any time obstructing the free flow of air through the main-reservoir port into the valve-casing, thereby at all times maintaining in the valve-casing a pressure equal to that of the main reservoir. One important result due to this construction lies in the fact that the valve may control the passage of main-reservoir pressure to the train-pipe and to the pump-governor without having placed upon it the function of controlling the main-reservoir port, thereby enabling its construction and operation to be greatly simplified.

The invention consists, secondly, in providing means for effectively controlling the wave-discharge valve, which operates to discharge from the train-pipe the wave or pulse of increased pressure occurring when the engineer's valve is moved from graduating to excess or blank positions. It has been proposed heretofore to control the opening and closing movements of a wave-discharge valve by attaching it to an abutment in the form of a piston or diaphragm, which abutment is, when the wave-discharge valve is closed, exposed to an equilibrium of pressure on its opposite sides and which is operated to open the discharge-valve by a disturbance of such equilibrium, recourse being had to a supplemental reservoir to reëstablish equilibrium of pressure and close the valve. In contradistinction to this I mount my wave-discharge valve in connection with an abutment, so that the two constitute a differential piston, the valve constituting the less face of the piston. Normally train-pipe air is admitted to one face of the abutment and to the oppositely-disposed face of the valve, and by reason of the differential areas of the abutment (which may be either of the piston or diaphragm form) and the valve I obtain not an equilibrium of pressure, but a greatly-overbalancing pressure on the abutment to hold the valve firmly to its seat. The face of the valve is in free and unobstructed communication with the train-pipe when the engineer's valve is in release, blank, or excess positions, and the space in the wave-discharge-valve casing behind the abutment is connected to the train-pipe through a restricted passage. In some forms of the device I cut off the wave-discharge-valve casing from the train-pipe by the graduating action of the engineer's valve and vent it to the atmosphere, thereby leaving both sides of the differential piston-valve exposed to atmospheric pressure only, the valve remaining seated by reason of its own inertia. In other forms of the device I leave the wave-discharge-valve casing in free communication with the train-pipe during graduation, so that when the tension of the train-pipe air is lowered by placing the engineer's valve in graduating position the tension is equally lowered on the valve-face and on the opposing face of the abutment, thereby maintaining the differential pressure which keeps the wave-discharge valve closed. In either of these forms when the engineer's valve is shifted from graduating to excess or blank position the pulse or wave (caused by the sudden checking of the current of air flowing through the train-pipe) strikes the face of the wave-discharge valve, opens it, and holds it open till sufficient air has passed to the rear of the abutment through the restricted passage to reëstablish the differential pressure and close the valve. The "dwell" of the wave-discharge valve or the time during which it remains open is determined by properly proportioning the atmosphere-port controlled by said valve and the restricted passage leading from the train-pipe to the rear of the abutment. By this construction I am enabled to hold the wave-discharge valve firmly to its seat by a differential pressure rather than an equilibrium of pressure and am also able to entirely dispense with the use of a supplemental reservoir and the complications incident thereto; and, finally, the invention consists in certain details of construction and combinations of elements, all of which will be hereinafter described, and then pointed out in the claims.

I have embodied in the accompanying drawings one of the many mechanical expressions which my invention may assume; but I wish it understood that such drawings are merely for the purpose of illustration and are not to be taken as in any way defining the limits of the invention.

In said drawings, Figure 1 is a central vertical section through the valve and valve-casing, the parts being in release position and portions being shown in elevation. Fig. 2 is a plan view of the casing with the valve removed and a portion of the top of the casing broken away to show the valve-seat and the several ports therein. Fig. 3 is a diagrammatic outline of the valve and the ducts formed therein. Figs. 3$^a$ and 3$^b$ are central vertical sections of a preferred form of wave-discharge valve. Fig. 4 is a vertical section on the line 4 4, Fig. 5, parts being in elevation, showing another form of wave-discharge valve in vertical section. Fig. 5 is a view similar to Fig. 1, showing the parts in graduating position. Fig. 6 is a dotted plan showing the positions of the several ports when the valve is in graduating position. Fig. 7 is a similar view when the valve is in excess position, and Fig. 8 is a like view when the valve is in blank position.

In the drawings, A represents the bottom or base portion of the valve-casing, having passage A' leading to the train-pipe and A$^2$ leading to the atmosphere, which passages open through ports $a'$ $a^2$ to the upper face of said base-piece, in which face is formed the valve-seat B' for the valve B.

C, Fig. 4, is a duct formed in the base-piece A and opening to said valve-seat B' through port $c$ and leading to the casing C' of the wave-discharge valve C$^2$.

D is a duct, also formed in the base A and having a port $d$ opening to the valve-seat B, the outer end of the duct being designed to be connected to a pump-governor, which governor acts to stop the pump when the pressure in the governor rises above a predetermined point, but permits it to start when the pressure falls below such point. As such governors are well known and form no part of the present invention, I have not thought it necessary to either show or describe the same.

A$^3$ is the top portion of the valve-casing and has a pipe A$^4$ leading from the interior of the casing to the main reservoir. (Not shown.)

The two parts A A$^3$ of the casing are united in any suitable way, as by bolts, so as to form an air-tight joint, and the valve B slides within the valve-chamber across the ports $a'$, $a^2$, $c$, and $d$, formed in the valve-seat B'.

The valve B has formed in the bottom face thereof a recess or chamber $b$, Figs. 1 and 3, which recess has extending therefrom a duct $b'$ of such a length that when the valve is in graduating position, Figs. 5 and 6, the duct extends part way over the port $a'$, thereby connecting said port with the chamber $b$; but when the valve is in release, blank, Fig. 8, or excess, Fig. 7, positions the duct $b'$, and hence the chamber $b$, is out of communication with the port $a'$. A second duct $b^2$ extends from the side of the chamber $b$ in position to register with or lie over the port $c$ only when the valve is in graduating position, Fig. 6. A third duct $b^3$ opens to the face of the valve through two ports $c'$ $c^2$, which ports are oblong in shape and so placed that in both the excess, Fig. 7, and the blank, Fig. 8, positions of the valve they respectively register with and connect the ports $a'$ and $c$; but in all other positions of the valve one or both of the ports $c'$ $c^2$ are closed, so that no air can pass through the duct $b^3$ from the port $a'$. A fourth duct $b^4$ communicates with the chamber $b$ and with the face of the valve through suitably-spaced ports $d'$ $d^2$. In excess position, Fig. 7, the port $d'$ registers with the port $d$ in the valve-seat, and in graduating position, Fig. 6, port $d^2$ registers with port $d$. In all other positions of the valve ports $d'$ and $d^2$ do not register with port $d$. A fifth duct $b^5$ extends from the end of the valve inward and then downward, opening to the valve-face through a port $d^3$, which registers with port $d$ only when the valve is in blank position, Fig. 8. It is to be observed, however, that when the valve is in release position the port $d$ is uncovered and is therefore in unobstructed communication with the main reservoir.

E is a boss or hub turning upon a pin E', projecting upward from the top of the valve B, while the arm E$^2$, attached to the hub E, telescopes with the horizontal arm F on the shaft F', which passes outward through a screw-cap G in the upper part A$^3$ of the valve-casing, suitable packing being provided so as to permit the shaft to turn in the cap with an air-tight joint.

H is a handle keyed to the shaft F', which handle may be provided with a suitable form of spring-stop bearing in the circumferential recess having shoulders $h'$, $h^2$, $h^3$, $h^4$, and $h^5$. (See Fig. 2.) By throwing the handle to the left, so that the spring-stop thereon abuts the shoulder $h'$, the valve is slid to release position. If the stop abuts shoulder $h^2$, the valve is in graduating position, Fig. 6, from which it may be shifted to either the blank or the excess positions, Figs. 7 and 8, by causing the stop to abut the shoulder $h^3$ or $h^4$, while by throwing the handle so that the stop abuts the shoulder $b^5$ on the extreme right the valve will be shifted to emergency position.

When the brakes have been applied, they may be released by shifting the handle of the valve so that the spring-stop thereon abuts the shoulder $h'$. In this position the full pressure from the main reservoir is permitted to enter the train-pipe and acts on the pistons of the triple valves to return them to position to exhaust the brake-cylinders and release the brakes. The engineer's valve may remain in this position (marked "release" in Fig. 2) while the train is running and until it is again desired to start the air-pump to increase the pressure in the main reservoir, which latter object is accomplished by moving the engineer's valve from release to excess position. When the desired pressure has thus been attained in the main reservoir, the valve may be moved to blank or release positions, either of which stops the pump, (by admitting pressure to the governor,) but will produce no other effect. When the movements of the valve have taken place in the order just named—i. e., from release to excess and from excess to blank or direct from release to blank—the brakes are "off" and the train is in normal running condition, so that under these circumstances release, excess, and blank positions are all "running" positions of the engineer's valve. In case, however, the valve is shifted from release to graduating or emergency position and then moved to excess or to blank position the brakes will remain applied while the valve is in either of said last two positions, the only difference in excess and blank being that in the former the pump is working, while in the latter it is not. The result of going to either of these positions from graduating position would be to discontinue the passage of air from the auxiliary reservoirs to the brake-cylinders, but to retain the braking pressure in said cylinders. It will thus be seen that excess or blank positions correspond to what is known in the art as "lap" position, providing braking pressure has been admitted to the brake-cylinders before the valve goes either to excess or blank.

By "lap" position is meant the position of the engineer's valve which retains whatever air-pressure may be in the brake-cylinders, but results in a discontinuance of the passage of air from the auxiliary reservoirs to the brake-cylinders.

Referring now to Fig. 4, the wave-discharge valve $C^2$, when seated, closes communication between the duct C and the port $c^3$, leading through the casing C' to the atmosphere. The upper portion of the casing C' forms, in effect, a cylinder, which in the form shown in Fig. 4 is connected to the duct C by means of a by-pass duct $c^4$. A piston $C^4$, having a surface area considerably in excess of that of the valve $C^2$, plays in the cylinder $C^3$ and is connected to the valve $C^2$ by a suitable stem, as shown. Preferably that portion of the cylinder $C^3$ between the valve and piston is open to the atmosphere—as, for example, through the port $c^5$. While this construction of wave-discharge valve is effective, I prefer, on account of its simplicity of construction, to use the form of valve shown in Figs. $3^a$ and $3^b$, in which the valve-casing C' has a chambered head or cap $C^5$ screwed thereon, so as to clamp a diaphragm $C^6$ between the cap and casing. This diaphragm may be made of any suitable material (rubber-coated cloth being excellent for the purpose) and is perforated at its center for the passage therethrough of the valve-stem, which is clamped to the diaphragm by securing the latter between a shoulder on the stem and suitable clamping-nuts $c^7$. Instead of the duct $c^4$ formed in the body of the valve-casing, as shown in Fig. 4, a duct $c^6$ passes from the face of the valve $C^2$ up through the valve-stem into the chambered head $C^5$ above the diaphragm. The space between the valve $C^2$ and the diaphragm $C^6$ is preferably open to the atmosphere through the port $c^3$, as the valve $C^2$ does not fit the casing air-tight. It will be noted that in Figs. $3^a$ and $3^b$, as well as in Fig. 4, the port $c^3$ is shown as of smaller area than duct C, the reason for which will appear hereinafter.

I may, if desired, attach the wave-discharge valve directly to the train-pipe, as indicated in dotted lines in Fig. 1, using either the form of valve shown in Figs. $3^a$ and $3^b$ or that of Fig. 4. In this case the wave-discharge-valve casing is not vented to the atmosphere when the engineer's valve moves to graduating position; but the difference between the pressures exerted on the discharge-valve and on the abutment is so lowered that the wave or pulse of air occurring when the engineer's valve goes to excess or blank position is strong enough to momentarily open the valve. Of course the relative areas of the valve and the abutment, as well as of the vent-port and the restricted passage leading to the rear of the abutment, are so adjusted that the pulse or wave shall be able to open the discharge-valve and secure the dwell on said valve necessary to discharge said wave or pulse.

The operation of my improved engineer's valve is as follows: The valve being thrown to release position, the ports $a'$ and $d$ are uncovered and air is free to pass from the main reservoir to the train-pipe and to the pump-governor, thereby operating the governor to stop the pump when the required pressure is reached in the main reservoir and also shifting all the triple valves in the train to release position, so that the brake-cylinders are in communication with the atmosphere and the auxiliary reservoirs are, through the feed-in valves, in communication with the train-pipe. If, now, it is desired to make a service application of the brakes, the engineer's valve is shifted to the second or graduating position, Figs. 5 and 6. This vents the governor to the atmosphere through duct D, ports $d$ $d^2$, duct $b^4$, chamber $b$, and port $a^2$, and thereby starts the pump. It also vents the cylinder $C^3$ of the wave-discharge valve through ducts $c^4$ and C, port $c$, duct $b^2$, chamber $b$, and port $a^2$ to the atmosphere, and at the same time it permits air to escape from the train-pipe through port $a'$, duct $b'$, chamber $b$, and port $a^2$, and as soon as the pressure in the train-pipe has been lowered, say, three pounds, the engineer shifts his valve to excess or blank position, the former if he desires to increase the pressure in the main reservoir and the latter if such pressure is as high as he desires it. The only difference in effect between the excess and the blank positions is that in the excess position, Fig. 7, the pump-governor is vented to the atmosphere and the pump is running to increase the pressure in the main reservoir, whereas in the blank position, Fig. 8, the port $d$ is open to the main reservoir through duct $b^5$ and port $d^3$, so that the governor stops the pump. In both excess and blank positions the train-pipe is cut off from the atmosphere-port $a^2$, and in both the train-pipe is connected through duct $b^3$ with the duct C, so that the pulse or wave of air, which would have a tendency to release the brakes on the forward cars, passes through the duct C, lifts the valve $C^2$, and causes a slight discharge of air to the atmosphere. Since, however, the port $c^3$ is of less area than duct C, air is forced through the duct $c^4$ into the cylinder $C^3$, and owing to the differential surfaces of the piston $C^4$ and valve $C^2$ the latter is quickly closed. Owing to the oblong shape of the ports $c'$ $c^2$ of duct $b^3$ this action of the valve $C^2$ takes place whether the engineer's valve is shifted from graduating to excess or to blank position, and in either of the latter positions pressure is retained in the brake-cylinders, as in a service application, provided the valve has first gone to graduating position. In case, however, the valve has been shifted from release position to either blank or excess position there will be no pressure in the brake-cylinders. In this case also it will be obvious that there will be no discharge of air through the wave-discharge valve, because the cylinder $C^3$ has not been previously vented. When the valve is shifted from release to excess position, the only effect is to vent the pump-governor to the atmosphere and allow the pump to start up, so as to increase the pressure in the reservoir. To shift the valve from excess to blank position admits pressure to the pump-governor, and thus stops the pump; but to shift the valve from release to blank position produces no effect whatever. From the blank or the excess positions graduating action may be repeated, or the valve may be shifted to release or to emergency position. In the latter case the main reservoir, the pump-governor, and the wave-discharge valve are shut off from each other, from the train-pipe, and from the atmosphere, while the large chamber $b$ is brought immediately over the ports $a'$ $a^2$, so that an unrestricted passage is provided from the train-pipe to the atmosphere, whereby the sudden reduction of pressure necessary to secure the emergency throw of the triple valves is obtained.

It will be noted that the valve-seat in the part A of the valve-casing is slightly cut away at each end, as shown at $x$ and $y$, so as to provide for wear and avoid any irregularities in the valve-seat, and this wear will be even and equal throughout, so that the valve will at all times form a close and effective joint with its seat, thereby preventing leaks, which would interfere with the accurate and reliable performance of its numerous functions. As shown, the casing of the wave-discharge valve is attached to the casing of the engineer's valve and communication is obtained between the train-pipe and the wave-discharge valve only through the engineer's valve; but I may attach the wave-discharge valve directly to the train-pipe, as shown in dotted lines in Fig. 1, in which case when the pressure in the train-pipe is lowered for graduating pressure on the upper side of the diaphragm would be also lowered through duct $c^6$, and when the valve B is shifted from graduating to excess or blank position the pulse or wave of pressure caused thereby will lift the valve $C^2$ from position shown in Fig. $3^a$ to that of Fig. $3^b$ and air will pass from the train-pipe to the atmosphere through port $c^3$, and also to the chambered cap $C^5$ above the diaphragm through the duct $c^6$, and owing to the difference in surface areas of the valve and the diaphragm the former will be quickly closed.

Having thus described my invention, I claim—

1. The combination of a train-pipe, an engineer's valve and its casing, a wave-discharge valve and its casing communicating with the train-pipe only through the engineer's valve, with means opening the train-pipe and wave-discharge-valve casing to the atmosphere when the engineer's valve is in graduating position, and means connecting the train-pipe to the wave-discharge-valve casing when the engineer's valve is moved from graduating to lap position.

2. The combination of an engineer's-valve casing and a wave-discharge-valve casing having a suitable passage connecting them, said engineer's-valve casing having ports leading to the main reservoir, the train-pipe and the atmosphere, with an engineer's valve and a wave-discharge valve in their respective casings, said engineer's valve having ducts therein simultaneously connecting the train-pipe and the wave-discharge-valve casing to the atmosphere when the engineer's valve is in graduating position and a third duct capable of connecting the train-pipe and the wave-discharge-valve casing.

3. The combination of a valve-casing having ports leading to the main reservoir, the train-pipe, the atmosphere, the pump-governor and a wave-discharge valve, with a slide-valve in said casing having ducts which, in one position of the valve, simultaneously connect the train-pipe, the pump-governor and the wave-discharge ports to the atmosphere-port and which in a different position connect the train-pipe and wave-discharge ports, and the pump-governor and atmosphere-ports.

4. The combination of the engineer's valve and its casing, a wave-discharge valve and its casing, said wave-discharge valve normally seating against train-pipe pressure, with a movable wall attached to but exceeding in area the wave-discharge valve, said wall being exposed when the engineer's valve is in lap position to train-pipe pressure on one side and to a less pressure on the other, and means venting the pressure on said wall to the atmosphere when the engineer's valve is in graduating position.

5. In an engineer's valve the combination of the valve-casing having a valve-seat formed therein, a duct formed in said casing and leading to the pump-governor and having a port opening into said valve-seat, and an engineer's valve sliding in said seat and having two ducts formed therein, one of which connects the pump-governor port in said seat to main-reservoir pressure when the engineer's valve is in blank position, and the other of which connects said port to the atmosphere when said valve is in graduating or excess positions.

6. The combination of a train-pipe having a port leading therefrom to the atmosphere, a wave-discharge valve normally closing said port against train-pipe pressure, a movable wall or abutment attached to but exceeding the wave-discharge valve in area, a duct leading from the train-pipe to an inclosed space behind said wall, thereby exposing said wall to train-pipe pressure on one side, and a chamber on the opposite side of said wall in which the pressure is less than train-pipe pressure.

7. The combination of a train-pipe having a port opening to the atmosphere, a valve normally closing said port, a piston attached to said valve by a suitable stem, said piston exceeding said valve in area, a large duct conducting train-pipe pressure to the valve-face, a restricted duct conducting train-pipe pressure to the opposing face of the piston, and a duct connecting the space between the valve and piston to the atmosphere.

8. In an engineer's valve the combination of a valve-casing in free communication with the main reservoir, and having ports leading to the train-pipe, the atmosphere, the pump-governor and to a wave-discharge valve, with a sliding valve in said casing moving over said ports and having ducts therein which simultaneously connect the train-pipe, pump-governor and wave-discharge ports to the atmosphere-port in one position, and the train-pipe port to the wave-discharge port and the pump-governor port to the atmosphere-port in another position.

9. In an engineer's valve the combination of a valve-casing in free communication with the main reservoir, and having ports leading to the train-pipe, the atmosphere, the pump-governor and to a wave-discharge valve, with a sliding valve in said casing moving over said ports and having ducts therein which simultaneously connect the train-pipe, pump-governor and wave-discharge ports to the atmosphere-port in one position, and connecting the pump-governor port to the main-reservoir port and the train-pipe port with the wave-discharge port in still another position.

10. The combination of the valve-casing having ports leading to the main reservoir, the train-pipe, the atmosphere, the pump-governor and the wave-discharge valve, with a slide-valve having ducts controlling communication between said ports, a revolving spindle having telescopic connection with an arm projecting from said slide-valve and a handle attached to said spindle and moving in the arc of a circle.

11. An engineer's-valve casing having train-pipe pump-governor and exhaust ports, means simultaneously connecting the train-pipe and pump-governor ports with the exhaust-port, and means for disconnecting the train-pipe and exhaust ports while leaving the pump-governor and exhaust ports still connected.

12. The combination of an engineer's-valve casing having exhaust and pump-governor ports, with an engineer's valve having means for connecting and disconnecting said ports while the valve is in running position.

13. The combination of an engineer's-valve casing having ports leading to the exhaust and to the pump-governor with means connecting the pump-governor and exhaust ports while the engineer's valve is shifting from release to emergency position.

14. The combination of an engineer's-valve casing having train-pipe, pump-governor, wave-discharge valve and atmosphere ports, with an engineer's valve having a duct connecting the pump-governor and atmosphere ports in one position but disconnecting them in another position, and a second duct connecting the train-pipe and wave-discharge ports in both said positions.

15. The combination of an engineer's-valve casing having exhaust and pump-governor ports, with an engineer's valve having means for connecting and disconnecting said ports while the valve is in lap position.

In testimony whereof I have signed this specification in the presence of two subscribing witnesses.

WILLIAM B. MANN.

Witnesses:
JOHN N. MATTHEWS,
JOSEPH T. GOTT.